United States Patent [19]

Becker et al.

[11] Patent Number: 4,793,660
[45] Date of Patent: Dec. 27, 1988

[54] HYDRAULIC BRAKE SYSTEM FOR AUTOMOTIVE VEHICLES

[75] Inventors: Horst P. Becker, Frankfurt am Main; Olaf Mogwitz, Glashuetten, both of Fed. Rep. of Germany

[73] Assignee: Alfred Teves GmbH, Frankfurt am Main, Fed. Rep. of Germany

[21] Appl. No.: 64,137

[22] Filed: Jun. 19, 1987

[30] Foreign Application Priority Data

Jul. 14, 1986 [DE] Fed. Rep. of Germany ....... 3623736

[51] Int. Cl.[4] .................. B60T 15/12; B60T 8/44; B60T 13/12; B60T 13/58
[52] U.S. Cl. ....................... 303/54; 303/114; 188/358; 60/563; 60/565; 60/548
[58] Field of Search .............. 60/547.1, 548, 563, 60/565, 582, 591; 303/6 A, 6 R, 50, 52, 54, 55, 59, 113, 114, 116, 117, 119; 188/355, 358

[56] References Cited

U.S. PATENT DOCUMENTS

| 2,470,746 | 5/1949 | Schultz | 303/54 |
| 2,698,205 | 12/1954 | Gagen | 303/54 |
| 2,799,140 | 7/1957 | Osborne | 60/563 |
| 4,181,371 | 1/1980 | Adachi | 60/582 |

FOREIGN PATENT DOCUMENTS

| 2450874 | 5/1975 | Fed. Rep. of Germany | 303/119 |
| 3338251 | 5/1985 | Fed. Rep. of Germany | . |
| 3422155 | 12/1985 | Fed. Rep. of Germany | . |
| 3427070 | 1/1986 | Fed. Rep. of Germany | . |
| 3502281 | 7/1986 | Fed. Rep. of Germany | . |
| 2149035 | 6/1985 | United Kingdom | 303/119 |
| 2158905 | 11/1985 | United Kingdom | 303/116 |

Primary Examiner—Andres Kashnikow
Assistant Examiner—Timothy Newholm
Attorney, Agent, or Firm—James B. Raden

[57] ABSTRACT

A hydraulic brake system for automotive vehicles has a master brake cylinder connected to an unpressurized reservoir and a brake line connected to a working chamber of the master brake cylinder and leading to pressure control valves of a brake slip control device. The pressure control valves are followed by wheel brake cylinders. The working chamber of the master brake cylinder is connectible to a pressure medium source upon the starting of the brake slip control device. The outlet pressure of the pressure medium source lies above the maximum braking pressure achievable by applying the master brake cylinder. The working chamber's front side (away from the first master cylinder piston) is sealed by a second master cylinder piston sealedly arranged within the master cylinder. The second master cylinder piston is sealed relative to the master cylinder by a non-return valve gasket. On the non-return valve gasket's side away from the working chamber an annular chamber is provided between the master cylinder and the second master cylinder piston, the pressure medium source being connected to said annular chamber.

3 Claims, 1 Drawing Sheet

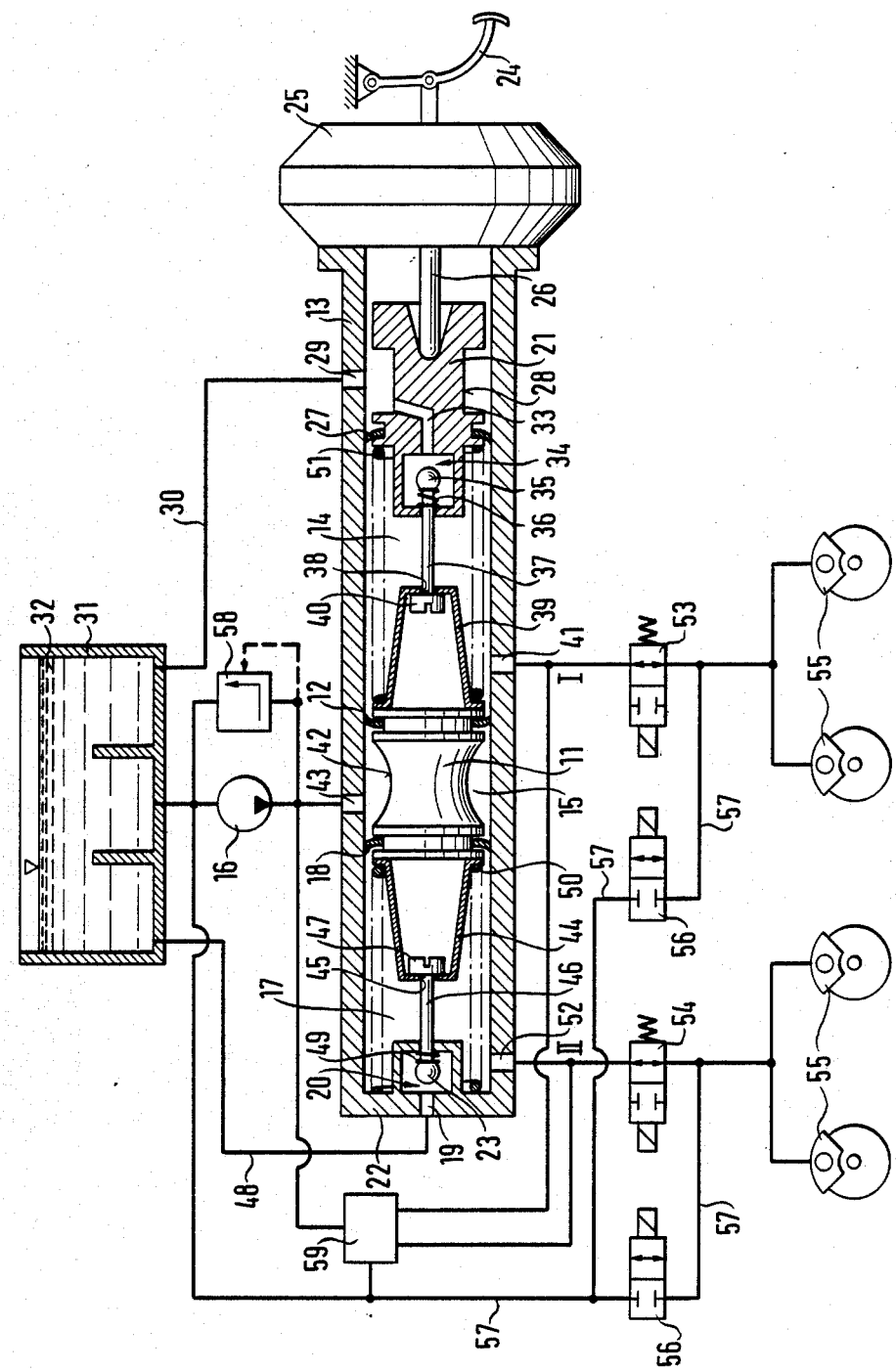

HYDRAULIC BRAKE SYSTEM FOR AUTOMOTIVE VEHICLES

BACKGROUND OF THE INVENTION

This invention relates to a hydraulic brake system and, more particularly to a hydraulic brake system for automotive vehicles. Such systems include a master brake cylinder which is connected to an unpressurized reservoir, has a master cylinder piston including a supply valve which opens in the rest position of the piston and is otherwise closed. The supply valve connects a supply bore provided behind the piston seal with a brake line connected to a master cylinder working chamber with which the piston cooperates. The brake line leads to pressure control valves of a brake slip control device, which valves lead to at least one wheel brake. Via a non-return valve the working chamber of the master brake cylinder is connected to a pressure medium source upon the starting of the brake slip control device. The outlet pressure of said pressure medium source lies above the maximum braking pressure achievable by applying the master brake cylinder so that, upon the starting of the brake slip control device, the master cylinder piston is displaced into its rest position. In this position the supply valve is opened until the pressure in the working chamber has dropped to the value corresponding to the actuating force at the brake pedal. The working chamber's front side away from the master cylinder piston is sealed by a second master cylinder piston sealingly arranged within the master cylinder.

In a suggested hydraulic brake system of this type (German Published Patent Application DE-OS No. 36 01 914, the additional pressure source required for brake slip control is in the form of a pump and is directly connected with the brake circuits to be controlled via non-return valves. This, however, implies an increase in the number of lines and the requirement of special non-return valves decoupling the turned-off pressure source from the master cylinder pressure.

SUMMARY OF THE INVENTION

It is an object of the present invention to provide a hydraulic brake system of the type referred to above where non-return valves designed as special components are not required and where the number of lines is reduced.

In accordance with this invention, the second master cylinder piston is sealed relative to the master cylinder by a non-return valve gasket and on the non-return valve gasket's side away from the working chamber an annular chamber is provided between the master cylinder and the second master cylinder piston and is connected to the pressure medium source. The non-return valve gasket opens when the pressure in the annular chamber is higher than that in the working chamber.

Thus, according to this invention, the additional pressure source is directly connected to the master cylinder so that only one additional hydraulic line is required between the pressure source and the master cylinder while it is possible to use the brake circuit lines, which emanate from the master cylinder, for the supply lines to the wheel cylinder brake circuits in case of brake slip control, too. Thus, the number of additional lines for brake slip control needed because of the additional pressure source are remarkably limited.

Further, according to this invention, the arrangement of special non-return valves arranged outside the master cylinder is rendered superfluous as the non-return valve is realized by the second master cylinder piston forming the front-side seal of the working chamber.

The advantages of this invention are even greater when the hydraulic brake system includes two working chambers, two master cylinder pistons and two brake circuits connected thereto. In this system, this invention provides that the second master cylinder piston pressurizing the second working chamber has a second non-return valve gasket on the annular chamber's side away from the first non-return valve gasket. Similar to the first non-return gasket, the second non-return valve gasket opens when the pressure in the annular chamber is higher than that in the second working chamber and is otherwise closed. The supply bore of the second working chamber directly borders on the second working chamber and is opened via a further supply bore in the rest position of the second master cylinder piston and is otherwise closed. Preferably the supply bore of the second working chamber is provided in the master cylinder's front wall away from the first master cylinder piston and a supply valve body of the second supply valve is connected with the second master cylinder piston in such a manner as to ensure that the supply valve body opens the supply bore in the second master cylinder piston's rest position and closes it otherwise.

With the arrangement, the second master cylinder piston performs a dual function. First it is responsible for the build-up of braking pressure in the second brake circuit. Second, it—along with the two non-return valve gaskets provided at the second master cylinder piston and acting in opposite directions—also performs the function of two non-return valves. Thus, the efforts for the additional arrangement of the two non-return valve gaskets are very small. Two circumferential seals otherwise likewise required are merely replaced by the non-return valve gaskets. In other words, the non-return valves are simply realized by ring seals especially designed as non-return valves. This contrasts with the prior known system where the additional pressure source is connected to the annular chamber of the second master cylinder piston so that the supply bore with the supply valve, which closes the supply bore upon braking, is provided in the area of the master cylinder at the second working chamber.

BRIEF DESCRIPTION OF THE DRAWING

A preferred embodiment of this invention will be described by way of an example with reference to the sole FIG. of the accompanying drawing which FIG. represents a schematical longitudinal section through a master cylinder of a hydraulic brake system as well as, by way of a block diagram, the components connected therewith.

DETAILED DESCRIPTION OF A PREFERRED EMBODIMENT

As shown in the drawing, the brake pedal 24 of an automotive vehicle pressurizes a vacuum brake booster 25 flanged to a master cylinder 13. The output tappet 26 of the vacuum brake booster 25 pressurizes a first master cylinder piston 21 slidingly arranged in the master cylinder 13 and sealed relative to the inside wall of the master cylinder 13 by means of a seal ring 27.

On the side of the seal ring 27 facing the vacuum brake booster 25, the first master cylinder piston 21 has a circumferential recess 28 bordered upon by a supply bore 29 of the master cylinder 13. A line 30 leads from the supply bore 29 to a reservoir 31 which contains the brake fluid 32. The reservoir 31 is not pressurized, but is arranged on a higher level than the master cylinder 13 so as to ensure that the brake fluid 32 may reach the supply bore 29 due to the force of gravity.

On the first master cylinder piston's 21 side away from the vacuum brake booster 25 a first working chamber 14 is provided which communicates with the annular recess 28 by means of a channel or passage 33 provided within the master cylinder piston 21.

On the first master cylinder piston's 21 front side, i.e., the side away from the vacuum brake booster 25, a supply valve 34 is located and comprises a ball-type supply valve body 35, a return spring 36 and an actuating tappet 37. The tappet 37 extends through a central bore 38 in an actuating cap 39 and is formed with a head 40, gripping the edge of the bore 38 from the inside of the cap.

In the first master cylinder piston's 21 rest position represented in the drawing, the head 40 rests at the border of the bore 38 thus—against the force of the spring 36—retracting the supply valve body 35 from the orifice of the channel 33 so that the supply valve 34 is open.

As soon as the depression of the brake pedal 24 causes the vacuum brake booster 25 to come into operation, the first master cylinder piston 21 will move to the left in the drawing. The head 40 of the actuating tappet 37 thus lifts off the edge of the bore 38 and the return spring 36 causes the supply valve body 35 to abut on the orifice of the channel 33, thereby closing the supply valve 34. The braking pressure builds up in the working chamber 14 for a brake circuit I connected to a discharge bore 41.

A spring 51 supported on the first master cylinder piston 21 and the actuating cap's 39 open side presses the cap 39 against the front side of a second master cylinder piston 11 slidingly arranged within the master cylinder 13. The second master cylinder piston 11 has a circumferential recess 42 which forms an annular chamber 15 between the circular cylindrical inside wall of the master cylinder 13 and the second master cylinder piston 11. The annular chamber 15 is connected to the output of a pump 16 via a connection bore 43 provided in the master cylinder 13.

Non-return valve gaskets 12 and 18 are provided, one on each axial end of the recess 42, on the second master cylinder piston 11. In case of an excess pressure in the annular chamber 15, the gaskets 12 and 18 open towards the working chambers 14 and 17, respectively.

In a mirror-inverted manner, a spring 50 supported on the front wall 22 presses a second actuating cap 44 with its open side against the second master cylinder piston's 11 front side away from the actuating cap 39. On its tapering end away from the second master cylinder piston 11, the second actuating cap 44 has a passage bore 45 for the actuating tappet 46 of a second supply valve 20. Within the actuating cap 44, the actuating tappet 46 has an enlarged head 47 gripping the border of the bore 45 from inside the actuating cap 44.

The actuating tappet 46 extends axially with respect to the master cylinder's 13 front wall 22 away from the vacuum brake booster 25. In the center of the front wall 22, a second supply bore 19 is provided for the second working chamber 17. A line 48 leads from the second supply bore to the reservoir 31 so as to supply the brake fluid 32 from the reservoir 31 to the second working chamber 17.

On the actuating tappet's 46 end facing the supply bore 19, again, a ball-type supply valve body 23 is provided which, by means of a return spring 49, is prestressed or biased in the direction of the supply bore 19.

Against the force of the return spring 49, the actuating cap 44 retracts the supply valve body 23 from its seat on the orifice of the supply bore 19 by means of the head 47 and the actuating tappet 46 in the two master cylinder pistons 11, 21 rest position represented in the drawing and ensured by the return springs 50, 51. Thus, the second supply valve 20 is also open in the rest position.

As soon as, in case of application of a force, the vacuum brake booster 25 causes the two master cylinder pistons 11, 21 to move to the left in the drawing the return spring 49 can move the supply valve body 23 in the direction of the supply bore 19. Even after a small movement of the second master cylinder piston 11, the second supply valve 20 is closed. It is thus also possible to pressurize a brake circuit II with braking pressure, because the brake circuit II is connected to a discharge bore 52 of the master cylinder 13 in the area of the second working chamber 17.

Connected to the brake circuits I and II are the wheel brake cylinders 55. Closing valves 53, 54 acted upon by a non-illustrated brake slip control device are located in the brake circuits and are normally open. Further, return lines 57 connect from the wheel brake cylinders 55 to the unpressurized reservoir 31. Opening valves 56, likewise actuated by the brake slip control device, are located in the return lines 57 and these valves are normally closed.

A pump-pressure-controlled pressure relief valve 58 is provided between the outlet side and the inlet side of the pump 16. Moreover, a differential pressure alarm switch 59 is connected to the delivery side of the pump 16, to the return line 57 as well as to the two brake circuits I and II. The differential pressure alarm switch 59 will switch off the non-illustrated brake slip control device is the pressure of the pump 16 drops below a predetermined pressure.

Moreover, the differential pressure alarm switch 59 is connected to the delivery side of the pump 16, to the return line 57 as well as to the two master cylinder chambers 14, 17. If the pressure of the pump 16 markedly falls below the master cylinder output pressure for a long period ($\Delta t \approx 0.5$ sec), the differential pressure alarm switch 59 will switch off the non-illustrated brake slip control device. Normally, there is a certain differential pressure between the pump output and the master cylinder chamber output due to the non-return valve action of the gasket 12, 18.

The mode of operation of the described brake system is as follows:

Upon a normal braking action without brake slip control the vacuum brake booster 25 started by the depressed brake pedal 24 at first will move the first master cylinder piston 21 into the master cylinder 13. The supply valve 34 will close and pressure will build up in the working chamber 14 which pressure will pressurize the brake circuit I and the second master cylinder piston 11, so that it too will move to the left in the drawing. This movement of the second master cylinder piston 11 will result in the closure of the second supply valve 20. Now a pressure will build up in the working chamber 17, too, said pressure pressurizing the brake circuit II.

If the non-illustrated brake slip control device detects a beginning of a slip condition at any one of the braked wheels, the pump 16 will switch on and generate a pressure in the annular chamber 15 which exceeds the pressure in the working chambers 14, 17. The greater pressure in the chamber 15 will open the non-return valve gaskets 12, 18 and the increased pressure can propagate into the working chambers 14, 17. Thereby the two master cylinder pistons 11 and 21 will be returned into their initial positions until the supply valves 20, 34 will open.

Attention has to be paid to a sufficient hardness of the return spring 36 so as to ensure that the supply valve 34 will be opened only when the second master cylinder piston 11 has returned to its rest position at which time the second supply valve 20 will open.

Upon the simultaneous opening of the supply valves 20, 34, the pressure in the working chambers 14, 17 will be decreased until it corresponds to the pedal pressure at the brake pedal 24. At this moment, the supply valves 20, 34 will close again, yet will re-open upon a reincrease of the pressure in the working chambers 14, 17. Thus, by means of closing and opening, the supply valves 20, 34 control the pressure in the working chambers 14, 17 to equal the operating pressure which corresponds to the pedal pressure.

Brake fluid depleted in the wheel brake cylinders 55 due to the cyclical operation of the closing valves 53, 54 and of the opening valves 56 is immediately resupplied by the pump 16 via the non-return valve gaskets 12, 18.

What is claimed is:

1. A hydraulic brake system for automotive vehicles, said system including a brake slip control device and comprising a master brake cylinder connected to an unpressurized reservoir, said master cylinder including a pedal-operated first master cylinder piston which includes a supply valve means which is responsive to the position of said first master cylinder piston to open in the rest position of the first master cylinder piston and is otherwise closed by an actuating force being applied to a brake pedal coupled thereto, said supply valve means connecting a working chamber in the master cylinder with a supply bore leading to an unpressurized reservoir, a brake line connected to the working chamber of the master brake cylinder and leading to pressure control valves of a brake slip control device, said valves being connectable to at least one wheel brake, the working chamber of the master brake cylinder being connected to a pressure medium source which source is actuated in response to and upon the starting of the brake slip control device, means being provided to control the outlet pressure of the pressure medium source so that the outlet pressure of the pressure medium source is greater than the maximum braking pressure achievable by applying the master brake cylinder so that, upon the starting of the brake slip control device, the first master cylinder piston is displaced into its rest position in response to a pressure differential thereacross and the supply valve means is opened until the pressure in the working chamber has dropped to a valve corresponding to the actuating force at the brake pedal whereupon said supply valve means closes, the working chamber's front side being away from the first master cylinder piston and being sealed by a second master cylinder piston sealedly arranged in the master cylinder, the second master cylinder piston being sealed relative to the master cylinder by a non-return valve gasket, an annular chamber formed between the master cylinder and the second master cylinder piston, said annular chamber being located on the non-return valve gasket's side away from the working chamber, the annular chamber being connected to the pressure medium source, the non-return valve gasket opening when the pressure in the annular chamber is higher than that in the working chamber create said pressure differential and thereby to displace said first master cylinder piston to open said supply valve until the pressure in the working chamber equals the pressure which corresponds to the pedal pressure.

2. A brake system as claimed in claim 1 with a second working chamber in the master cylinder and another brake circuit connected thereto, the second master cylinder piston being operated to pressurize the second working chamber and having a second non-return valve gasket located on the annular chamber's side away from the first non-return valve gasket, said second non-return valve gasket opening when the pressure in the annular chamber is higher than that in the second working chamber and being otherwise closed, a supply bore for the second working chamber directly bordering on the second working chamber and being opened by a further supply valve means in the rest position of the seond master cylinder piston and being otherwise closed.

3. A brake system as claimed in claim 2, wherein the supply bore of the second working chamber is provided in the master cylinder's front wall, the front wall being away from the first master cylinder piston, a supply valve body of a second supply valve means being connected with the second master cylinder piston in such a manner as to ensure that the supply valve body opens the supply bore in the second master cylinder piston's rest position and closes it otherwise.

* * * * *